(12) United States Patent
Maienschein et al.

(10) Patent No.: US 10,415,667 B2
(45) Date of Patent: Sep. 17, 2019

(54) DAMPER SYSTEM

(71) Applicant: Schaeffler Technologies AG & Co. KG, Herzogenaurach (DE)

(72) Inventors: Stephan Maienschein, Baden-Baden (DE); Christian Huegel, Rheinau (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 136 days.

(21) Appl. No.: 15/327,463

(22) PCT Filed: Jul. 22, 2015

(86) PCT No.: PCT/DE2015/200413
§ 371 (c)(1),
(2) Date: Jan. 19, 2017

(87) PCT Pub. No.: WO2016/012023
PCT Pub. Date: Jan. 28, 2016

(65) Prior Publication Data
US 2017/0175850 A1   Jun. 22, 2017

(30) Foreign Application Priority Data

Jul. 24, 2014  (DE) .................. 10 2014 214 519
Sep. 2, 2014   (DE) .................. 10 2014 217 472
Nov. 6, 2014   (DE) .................. 10 2014 222 712

(51) Int. Cl.
*F16F 15/133*   (2006.01)
*F16F 15/134*   (2006.01)
*F16F 15/14*    (2006.01)

(52) U.S. Cl.
CPC ...... *F16F 15/13469* (2013.01); *F16F 15/145* (2013.01)

(58) Field of Classification Search
CPC .. F16F 15/145; F16F 15/121; F16F 15/13469; F16F 15/14
See application file for complete search history.

(56) References Cited

U.S. PATENT DOCUMENTS

2010/0242466 A1* 9/2010 Krause ................ F16F 15/145
                                                    60/327
2014/0113733 A1  4/2014 Verhoog et al.

FOREIGN PATENT DOCUMENTS

| CN | 102918296 A | 2/2013 | |
|---|---|---|---|
| DE | 102010049930 A1 | 5/2011 | |
| DE | 102010054254 A1 | 6/2011 | |
| DE | 102011017660 A1 | 10/2012 | |
| WO | WO-2012146451 A1 * | 11/2012 | ............ F16F 15/145 |
| WO | 2012168604 A1 | 12/2012 | |

* cited by examiner

*Primary Examiner* — Thomas C Diaz

(57) ABSTRACT

A damper system which is supportable rotatably around an axis of rotation, having a first absorber device and a second absorber device. The first absorber device includes at least one first pendulum mass, a first coupling device and a first flange part. The first pendulum mass is coupled with the first flange part by means of the first coupling device. The first coupling device is designed to guide the first pendulum mass along a first oscillation path. The second absorber device is offset radially from the first absorber device. The second absorber device includes an absorber element. The absorber element is coupled with the first flange part.

10 Claims, 3 Drawing Sheets

DAMPER SYSTEM

CROSS-REFERENCE TO RELATED APPLICATION

The present application is the U.S. national stage application pursuant to 35 U.S.C. § 371 of International Application No. PCT/DE2015/200413, filed Jul. 22, 2015, which application claims priority from German Patent Application No. DE 10 2014 214 519.8, filed Jul. 24, 2014, German Patent Application No. DE 10 2014 217 472.4, filed Sep. 2, 2014, and German Patent Application No. DE 10 2014 222 712.7, filed Nov. 6, 2014, which applications are incorporated herein by reference in their entireties.

TECHNICAL FIELD

The invention relates to a damper system with radially offset absorber devices.

BACKGROUND

Damper systems for eliminating rotational non-uniformities in a drivetrain of a motor vehicle are known.

SUMMARY

According to the present disclosure, it has been recognized that an improved damper system can be provided by the damper system being supportable so that it can rotate about an axis of rotation. The damper system includes a first absorber device and a second absorber device. The first absorber device includes at least a first pendulum mass, a first coupling device and a first flange part. The first pendulum mass is coupled with the first flange part by means of the coupling device. The second coupling device is designed to guide the first pendulum mass along a first oscillation path. The second absorber device is offset radially from the first absorber device, with the second absorber device including an absorber element, the absorber element being coupled with the first flange part.

In this way, an especially compact damper system is provided, with the damper system including an especially small proportion of components, so that the damper system is producible especially inexpensively. Furthermore, due to the small number of components, a rotating mass is especially low, and has an especially high eradicating effect despite the low mass.

In an example embodiment, the second absorber device has a second flange part. The second flange part is at least partially spaced apart axially from the first flange part, and is coupled with the first flange part. The absorber element is positioned axially between the first flange part and the second flange part, and is coupled with the second flange part.

In another embodiment, at least a portion of the first pendulum mass is positioned axially between the first flange part and the second flange part. This makes it possible to design a damper system which is compact, especially in the axial direction.

In another embodiment, an absorber mass is positioned axially between the first flange part and the second flange part. In this case, the absorber element is designed as a spring element, with the absorber element being coupled with the absorber. This enables a spring mass damper to be inserted between the first flange part and the second flange part in compact construction, so that an especially compact damper system having an order-dependent and frequency-dependent absorber device is provided. This enables an especially good isolation and elimination of rotational non-uniformities to be achieved in a drivetrain.

In another embodiment, the absorber element extends at least partially in the circumferential direction. The first and/or second flange part has a receptacle in this case, and the absorber element engages the receptacle at least partially, enabling the absorber element to be fixed in its position especially well.

In another embodiment, the absorber element is designed as a second pendulum mass. The second absorber device includes a second coupling device. The absorber element is coupled with the first and the second pendulum flange by means of the second coupling device. The second coupling device is designed to guide the absorber element along a second oscillation path. In this way, it is also possible for the damper system to include two order-dependent absorber devices, which are tuned to different damping orders for example because of a difference in the form of the first oscillation path and second oscillation path. In this way, it is possible to achieve especially reliable elimination of orders of excitation of the reciprocating engine by the damper system in a simple manner, with and without cylinder deactivation.

In another embodiment, the pendulum mass has a first pendulum mass part and a second pendulum mass part. The first pendulum mass part and the second pendulum mass part are positioned on both sides of the first flange part, with the first pendulum mass part being connected to the second pendulum mass part by means of a connecting element. The connecting element reaches at least partially through the first flange part.

In another embodiment, the damper system includes an input side, an output side and a first torsion damper. The first torsion damper is positioned between the input side and the first flange part, and couples the input side with the first flange part. The second flange part is coupled with the output side. In this way, in addition the rotational non-uniformities are damped.

In an example embodiment, the damper system has an input side, an output side and a first torsion damper, with the first torsion damper being positioned between the input side and the second flange part and coupling the input side with the second flange part. The second flange part is coupled with the output side.

In another embodiment, the damper system has a second torsion damper, with the second torsion damper being positioned between the output side and the second flange part, where the second torsion damper couples the second flange part with the output side.

BRIEF DESCRIPTION OF THE DRAWINGS

The invention will be explained in greater detail below on the basis of figures. The figures show the following.

DETAILED DESCRIPTION

Figure 1:
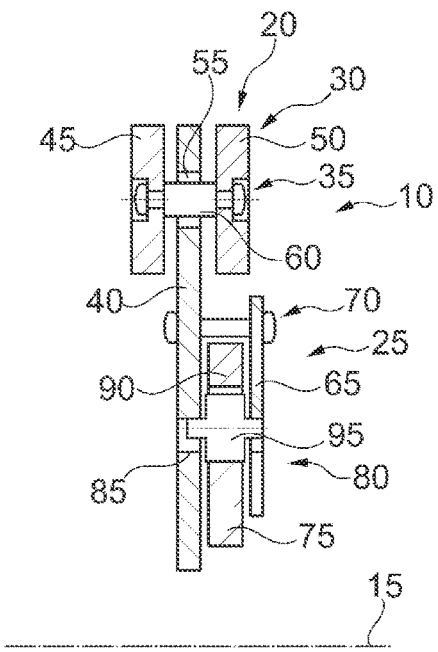
FIG. 1 is a semi-longitudinal section through a damper device according to a first embodiment.

FIG. 1 shows a semi-longitudinal section through damper device 10 according to a first embodiment. Damper device 10 is supportable so that device 10 can rotate about axis of rotation 15. Damper device 10 comprises absorber device 20 and absorber device 25.

Absorber device 20 includes pendulum mass 30, coupling device 35 and flange part 40. Flange part 40 is of disk-shaped design, and extends essentially in a radial direction. Flange part 40 may be supported, for example, on the radially inner side of part 40 on a hub. Furthermore, it is also possible for flange part 40 to be connected torsionally to another unshown component of a drive system, or to damper device 10.

Pendulum mass 30 includes pendulum mass part 45 and pendulum mass part 50. Pendulum mass parts 45 and 50 are positioned on opposite sides of flange part 40, and are connected by means of coupling device 35 to flange part 40 so that parts 45 and 50 can move to a limited extent. Coupling device 35 is designed to guide pendulum mass 30 along a first oscillation path. In combination with a mass of pendulum mass 30, coupling device 35 determines a first absorber order of absorber device 20.

To connect pendulum mass part 45 to pendulum mass part 50, coupling device 35 also has cutout 55 and connecting element 60 located in flange part 40. Connecting element 60 reaches through cutout 55 in an axial direction. Connecting element 60 is designed as a spacer bolt, and determines on the one hand an axial distance between pendulum mass part 45 and pendulum mass part 50. Furthermore, connecting element 60 connects pendulum mass part 45 to pendulum mass part 50. Furthermore, coupling device 35 has cutouts in pendulum mass parts 45, 50, respectively, and cutout 85 in flange part 40, through which coupling element 95 reaches in order to guide pendulum mass 30 along the first oscillation path in the manner of a slotted guide (not shown).

In the embodiment of FIG. 1, absorber device 25 is positioned radially to the inside of absorber device 20. In the embodiment of FIG. 1, absorber device 25 has the form of a centrifugal pendulum located inside. Thus, absorber device 25, like absorber device 20, is dependent on rotation speed. Absorber device 25 includes flange part 65. Flange part 65 is of disk-shaped design, and extends essentially in the radial direction. Flange part 65 is spaced apart axially from flange part 40. Flange part 65 is connected to flange part 40 in a torque-locked connection by means of connection 70, which has the form of riveted connection 35 in this embodiment. At least a portion of pendulum mass 30 is positioned axially between parts 40 and 65. For example, at least a portion of part 50 is positioned axially between parts 40 and 50.

Between flange part 40 and flange part 65, absorber device 25 has pendulum mass 75 in the form of an absorber element. In this embodiment, pendulum mass 75 is designed, for example, as a single piece. It is of course also possible for pendulum mass 75 to be designed in multiple pieces. In this embodiment, connection 70 is located radially to the outside of pendulum mass 75 and radially to the inside of pendulum mass 30. This enables flange part 65 to be tied especially firmly to flange part 40. It is of course also possible for connection 70 to be positioned radially to the inside of pendulum mass 75. Furthermore, absorber device 25 has coupling device 80.

Coupling device 80 has cutout 85 located in flange part 40 and in flange part 65, and cutout 90 located in pendulum mass 75. Coupling element 95 of coupling device 80 reaches through cutouts 85, 90 in the axial direction. Coupling element 95 is designed, for example, as a pendulum roller. By means of coupling device 80, pendulum mass 75 is connected to flange part 40 and to flange part 65 so that mass 75 is movable to a limited extent. Coupling device 80 is designed to guide pendulum mass 75 along a second oscillation path. In combination with a mass of pendulum mass 75, coupling device 80 determines a second absorber order of absorber device 25. The second absorber order may be different from the first absorber order of absorber device 20.

Damper device 10 is especially well suited for a drive system having a reciprocating engine as the drive motor. If the reciprocating engine has cylinder deactivation, the reciprocating engine has a separate order of excitation in each of the two operating modes. A first order of excitation of the reciprocating engine exists in the operation with all cylinders, and a second order of excitation in the operation of the reciprocating engine with cylinder deactivation. It is particularly advantageous in this case if the first absorber order of absorber device 20 is matched to the first order of excitation of the reciprocating engine and the second absorber order of absorber device 25 is matched to the second order of excitation of the reciprocating engine. This enables damper device 10 to damp rotational non-uniformities coming from the reciprocating engine in both operating modes especially effectively. Furthermore, because of the design and the coupling of absorber devices 20, 25 with common flange part 40, 65 the form of damper device 10 is especially compact.

Figure 2:
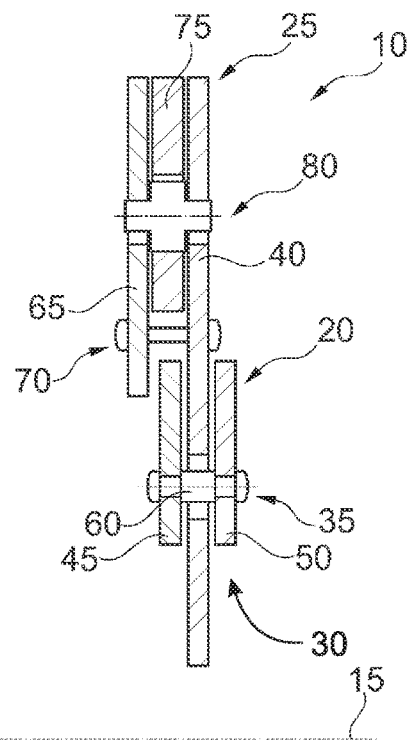
FIG. 2 is a semi-longitudinal section through a damper device according to a second embodiment.

FIG. 2 shows damper device 10 according to a second embodiment. Damper device 10 in FIG. 2 is similar in design to damper device 10 shown in FIG. 1. Differing therefrom, the arrangement of absorber device 20 and t absorber device 25 is transposed in the radial direction. Thus, absorber device 25 is positioned radially to the outside of absorber device 20. Furthermore, flange part 65 is positioned on the side opposite flange part 40, in reference to the arrangement in FIG. 1.

Figure 3:
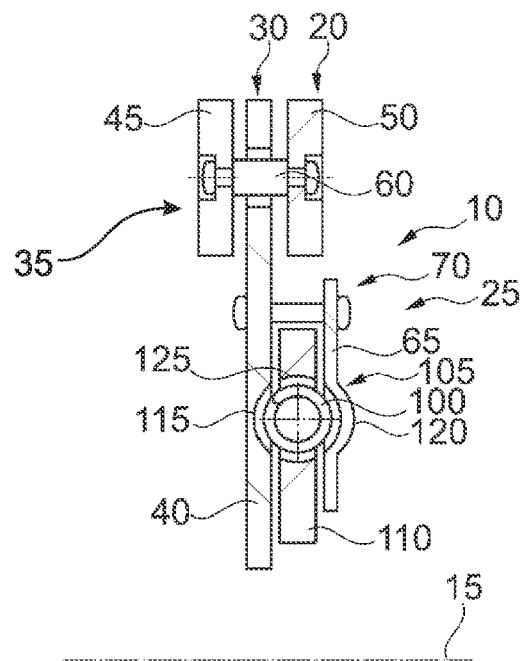
FIG. 3 is a semi-longitudinal section through a damper device according to a third embodiment.

FIG. 3 shows a semi-longitudinal section through damper device 10 according to a third embodiment. Damper device 10 in FIG. 3 is similar in design to damper device 10 shown in FIG. 1. Differing therefrom, the design of absorber device 25 is dependent on frequency instead of on rotation speed. Absorber device 20 is designed as shown in FIG. 1.

Absorber device 25 has spring element 100 designed as an absorber element, receptacle 105 and absorber mass 110. Absorber mass 110 is positioned axially between flange part 40 and flange part 65. Receptacle 105 is formed by receptacle section 115, which is positioned in flange part 40 in the shape of a partial circle, and by receptacle section 120, which is positioned in flange part 65 opposite receptacle section 115. Receptacle 105 here is designed corresponding to a form of spring element 100 on the circumference. Spring element 100 is positioned in the circumferential direction and/or tangentially to axis of rotation 15. In this embodiment, spring element 100 is designed as a coil spring running in a straight line in the circumferential direction. It is of course also possible for spring element 100 to have the form of a bow spring which runs in a circular path about axis of rotation 15. Furthermore, receptacle 105 has cutout 125 in absorber mass 110. Spring element 100 reaches through cutout 125 and engages receptacle sections 115, 120. Spring element 100 is supported by a first longitudinal end on flange part 40 and flange part 65.

By means of flange part 40, a rotational non-uniformity is introduced through flange part 40 into flange part 40. Flange part 40 conducts the rotational non-uniformity on through connection 70 into flange part 65. The rotational non-uniformity is coupled by flange part 40 and by flange part 65 through the first longitudinal end of element 100 into spring element 100. The rotational non-uniformity tightens spring element 100 in the circumferential direction, while absorber mass 110 presses against the second longitudinal end of element 100 because of the mass inertia of mass 110. Spring element 100 forms together with absorber mass 110 a resonant circuit, with which an excitation frequency of the reciprocating engine is canceled out.

Figures 4, 5:
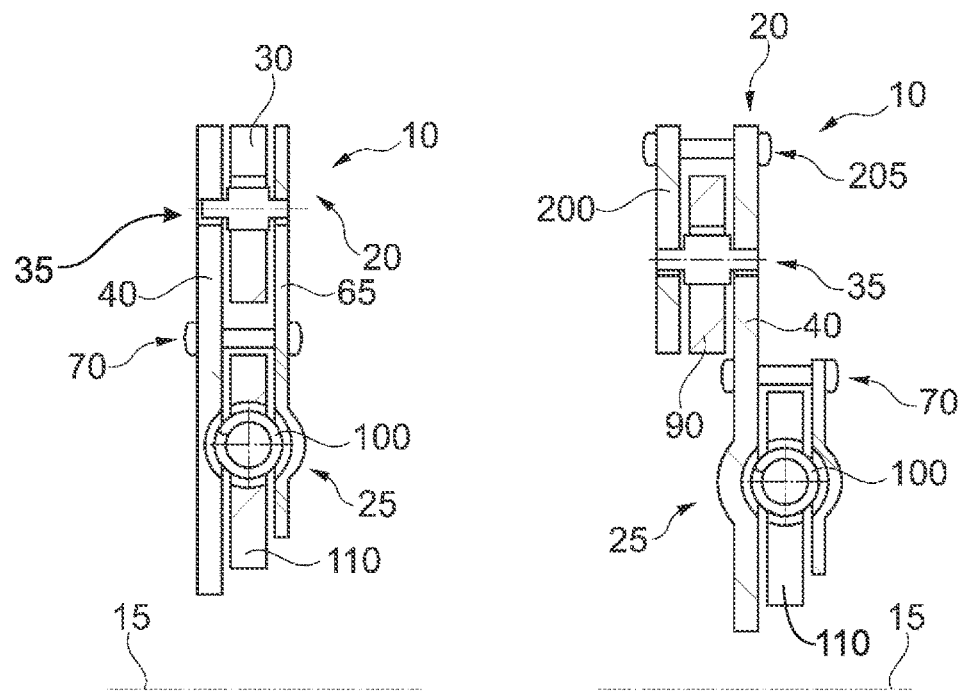
FIG. 4 is a semi-longitudinal section through a damper device according to a fourth embodiment.
FIG. 5 is a semi-longitudinal section through a damper device according to a fifth embodiment.

FIG. 4 shows a semi-longitudinal section through damper device 10 according to a fourth embodiment. Damper device 10 in FIG. 4 is similar in design to damper device 10 shown in FIG. 3. Differing therefrom, absorber device 25 is designed as a centrifugal pendulum located inside.

In this case, absorber device 25 has flange part 200. Flange part 200 here is spaced apart axially from flange part 40 on a side of flange part 40 facing away from flange part 65. Flange part 200 is connected to flange part 40 by means of connection 205. Connection 205 is located radially to the outside of pendulum mass 30, which in this embodiment is located axially between flange part 200 and flange part 40. Pendulum mass 75 is guided along the second oscillation path by means of coupling device 35.

FIG. 5 shows a semi-longitudinal section through damper device 10 according to a fifth embodiment. Damper device 10 in FIG. 5 is similar in design to damper device 10 shown in FIG. 4. Differing therefrom, pendulum mass 30 is located on a side opposite flange part 40, in reference to FIG. 4. As a result, connection 205 and flange part 200 can be dispensed with in comparison to FIG. 4. Flange part 40 extends in the radial direction over both absorber device 20 and absorber device 25, so that absorber mass 110 as well as pendulum mass 30 and spring element 100 are located between flange part 40 and flange part 65. Flange parts 40, 65 end radially to the outside at essentially the same level. Radially to the inside there can be a tie-in to a component through the flange part 40 and/or flange part 65. This enables the damper device to be utilized flexibly in various types of damper systems.

Figure 6:
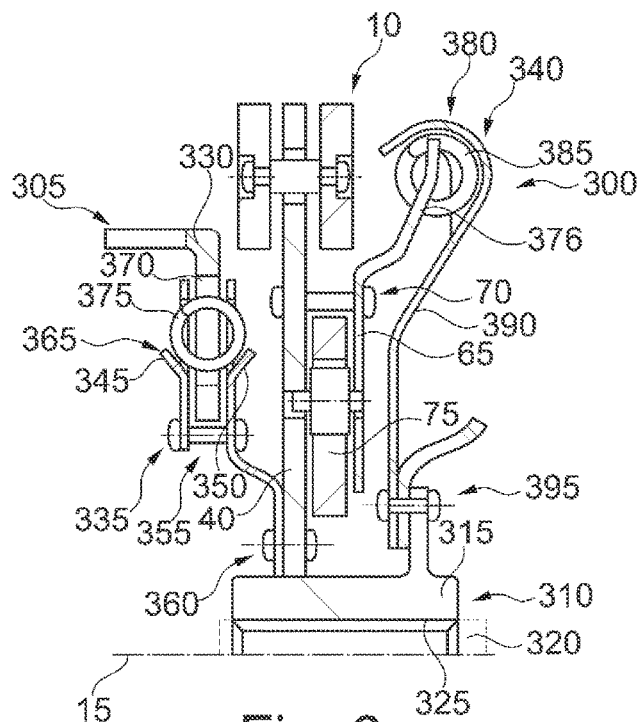
FIG. 6 is a semi-longitudinal section through a damper system according to a first embodiment.

FIG. 6 is a semi-longitudinal section through damper system 300 according to a first embodiment. Damper system 300 has input side 305 and output side 310. Input side 305 is connected, for example, in a torque-locked connection to a clutch device. Input side 305 of damper system 300 includes disk carrier 330 of the clutch device. Output side 310 has hub 315 in this embodiment. In an example embodiment, hub 315 is connected in a torque-locked connection to a transmission input shaft (shown dashed), for example by means of a shaft-to-hub connection 325. Damper system 300 includes torsion damper 335, damper device 10 and torsion damper 340. Damper device 10 in FIG. 6 is similar in design to damper device 10 shown in FIG. 1. It is of course also possible for damper device 10 to be designed in accordance with one of the embodiments shown in FIGS. 2 through 5.

Torsion damper 335 has lateral plate 345, and lateral plate 350 spaced apart axially from lateral plate 345. Lateral plate 345 is connected to lateral plate 350. Lateral plate 350 is tied radially on the inside to the flange part 40 in a torque-locked link by means of tie-in 360, which has the form of a riveted connection in this embodiment. Flange part 40 is supported radially on the outside on hub 315, and is rotatable relative to hub 315.

Torsion damper 335 is positioned between input side 305 and flange part 40, and includes retainer 365, which is formed by lateral plates 345, 350, and damper element 375. Plate carrier 330 has damper element cutout 370. In this embodiment, damper element 375 has the form of a spring element. Damper element 375 extends along a circular path around axis of rotation 15 and/or tangentially to axis of rotation 15, and has a first end and a second end. Damper element 375 is located in retainer 365, which fixes a position of damper element 375 in the axial and radial directions.

Flange part 65 of damper device 10 in FIG. 6 differs from FIG. 1 to the effect that flange part 65 has engaging segment 376 radially to the outside of connection 70 and/or of pendulum mass 75. Engaging segment 376 is aligned obliquely to axis of rotation 15.

Torsion damper 340 has retainer 380, damper element 385, which has the form of a spring element in this embodiment, and output disk 390. Damper element 385 is, for example, a spring element, which extends in a straight line tangentially to axis of rotation 15 and/or on a circular path around axis of rotation 15. damper elements 375, 385 may have the form of a bow spring or coil spring.

Output disk 390 forms retainer 380 radially on the outside by means of a section running in the axial direction radially on the outside in the direction of damper device 10, damper element 385 being positioned and held in its position in second retainer 380. Damper element 385 is coupled by a first end with output disk 390. Damper element 385 is coupled by a second end with engaging segment 376. Radially to the inner side of pendulum mass 75, pendulum flange 390 is connected torsionally to hub 315 through tie-in 395.

When torque is introduced into input side 305, the torque is passed on by disk carrier 330 to the first end of damper element 375. At the same time, disk carrier 330 compresses damper element 375 with respect to a second end of damper element 375. Through the second end of damper element 375, the torque is extracted from damper element 375 and passed along to lateral plates 345, 350. Lateral plate 350 further forwards the torque through tie-in 360 to flange part 40, so that torsion damper 335 couples input side 305 with flange part 40. The torque is transmitted from tie-in 360 to flange part 40, and from there through connection 70 into flange part 65. Flange part 65 transmits the torque to damper element 385 by means of engaging segment 376. Damper element 385 is compressed by the torque to be transmitted, and actuates output disk 390. Output disk 390 transmits the torque radially from outside to inside, and passes the torque through tie-in 395 to hub 315. By means of shaft-to-hub connection 325, the torque is extracted from damper system 300 into the transmission input shaft. If the rigidity of torsion damper 335, 340 is less than the rigidity of transmission input shaft, and if the torque has a rotational non-uniformity, depending on the order of the rotational non-uniformity at least one of absorber devices 20, 25 is excited to oscillation, in order to at least partially cancel out the rotational non-uniformity by means of pendulum masses 30, 75 which serve as energy storage elements while oscillating along the oscillation path.

The design of damper system 300 described in FIG. 6 has the advantage that by means of damper device 10 on the one hand two different absorber orders can be provided, and thus two different varying orders of excitation of a reciprocating engine can be damped effectively, as described above. At the same time, the design of damper device 10 in damper system 300 offers an arrangement which is particularly optimized in terms of construction space, while by means of damper device 10, along with the elimination of rotational non-uniformities, at the same time the torque can also be transmitted via flange parts 40, 65. In this way, an especially cost-effective damper system 300 is provided. Damper device 10 can be designed, in this case, as described in FIG. 1.

Figure 7:
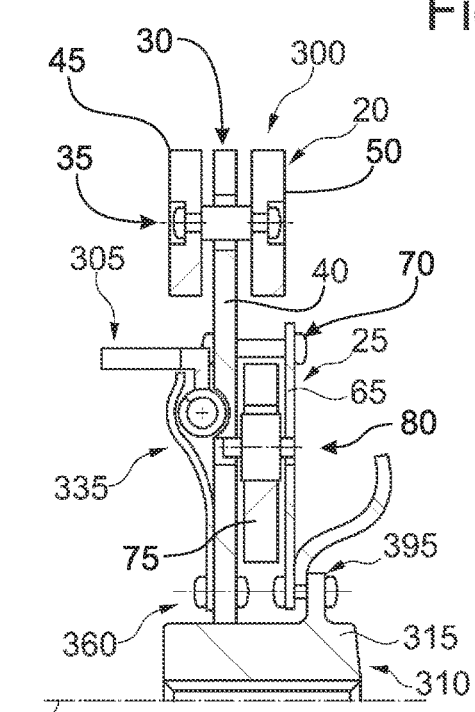
FIG. 7 is a semi-longitudinal section through a damper system according to a seventh embodiment.

FIG. 7 shows a semi-longitudinal section through damper system 300 according to a second embodiment. Differing from damper system 300 shown in FIG. 6, torsion damper 340 is dispensed with in FIG. 7. Furthermore, in FIG. 7, lateral plate 350 explained in FIG. 6 is dispensed with. Lateral plate 350 is replaced in this embodiment by flange part 40. Because torsion damper 340 is omitted, compared to FIG. 6, flange part 65 in FIG. 7 is connected torsionally through tie-in 395 to hub 315, and thus to output side 310.

It would of course also be possible for flange part 40 to be connected to hub 315 through t tie-in 360 (not shown). In this case, tie-in 395 of flange part 65 to hub 315 can be dispensed with, so that the number of components is further reduced.

Figure 8:
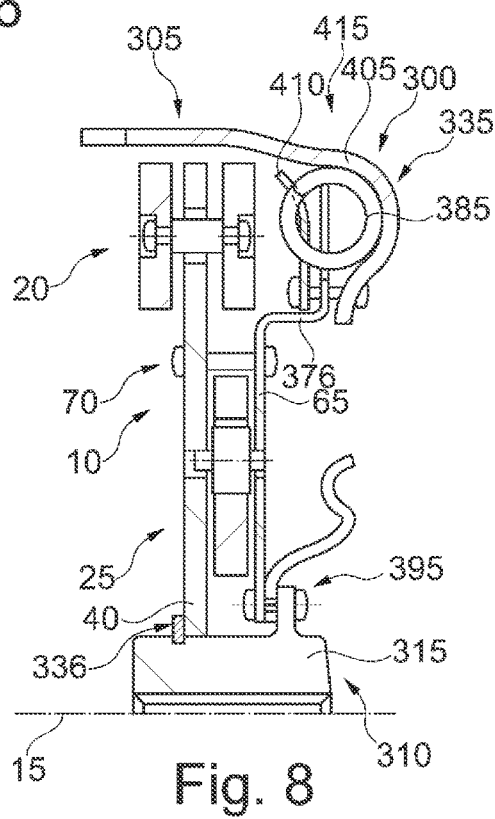
FIG. 8 is a semi-longitudinal section through a damper system according to a third embodiment.

FIG. 8 shows a semi-longitudinal section through damper system 300 according to a third embodiment. Damper system 300 in FIG. 8 is similar in design to damper systems 300 shown in FIGS. 6 and 7. In this case, damper system 300 includes torsion damper 335 positioned between input side 305 and damper device 10. Flange part 65 in FIG. 8 is designed as shown in FIG. 6, and has engaging segment 376 located radially outside. In contrast to FIG. 6, however, engaging segment 376 in FIG. 8 is pot-shaped. Flange part 65 is coupled torsionally with hub 315 radially on the inner side, through tie-in 395. In FIG. 8, flange part 40 is supported rotatably on hub 315, as in FIG. 6, but securing device 336 is provided in order to fix an axial position of flange part 40 in relation to hub 315.

Torsion damper 335 in FIG. 8 is similar in design to torsion damper 340 shown in FIG. 5, and is positioned between input side 305 and flange part 65. Torsion damper 335 has damper element 385, lateral plate 405 and lateral plate 410. Lateral plates 405, 410 together form retainer 415, in which damper element 385 is positioned. Lateral plates 405, 410 are torsionally connected with one another in this case. Engaging segment 376 runs axially between lateral plates 405, 410. Lateral plates 405, 410 are coupled with a first end of damper element 385, while on the other hand a second end of damper element 385 is coupled with engaging segment 376.

Torque is transmitted from input side 305 to lateral plate 405, and from lateral plate 405 in parts to lateral plate 410. Lateral plates 405, 410 introduce the torque together into the first end of damper element 385. Damper element 385 is compressed in a circumferential direction, and damper element 385 presses with its second end against engaging segment 376. Thus, torsion damper 335 couples input side 305 with flange part 65. The torque is extracted from torsion damper 335 through engaging element 375, and is passed on through flange part 65 to tie-in 395. If the torque introduced through engaging segment 376 has a rotational non-uniformity, then at least one of absorber devices 20, 25 is excited to oscillation, depending on the order of the rotational non-uniformity, in order to at least partially cancel out the rotational non-uniformity. As this occurs, absorber device 20 and/or absorber device 25 is able to damp the rotational non-uniformity, depending on the order of the rotational non-uniformity. Damper device 10 can be designed in this case as described in FIG. 1.

Furthermore (not shown), it is also possible that in addition to torsion damper 335 shown in FIG. 8, torsion damper 340 shown in FIG. 6 is also provided, in which case torsion damper 340 is then positioned between flange part 65 and output side 310 and connects flange part 65 torsionally to output side 310.

Damper device 10 shown in FIGS. 1 through 8 in combination with damper system 300 shown in FIGS. 6 through 8 has the benefit that two orders of excitation of the drive motor can be damped simultaneously. Furthermore, by coupling the absorber devices 20 and 25 through flange part 40 an especially compact damper device 10 and an especially compact damper system 300 is provided.

REFERENCE LABELS 10 damper device
15 axis of rotation
20 first absorber device
25 second absorber device
30 first pendulum mass
35 first coupling device
40 first flange part
45 first pendulum mass part
50 second pendulum mass part
55 first cutout
60 connecting element
65 second flange part
70 first connection
75 second pendulum mass
80 second coupling device
85 fourth cutout
90 fifth cutout
95 second coupling element
100 spring element
105 receptacle
110 absorber mass
115 first receiving section
120 second receiving section
125 second cutout
200 third flange part
205 second connection
300 damper system
305 input side
310 output side
315 hub
325 shaft-hub connection
330 disk carrier
335 first torsion damper
340 second torsion damper
345 first lateral plate
350 second lateral plate
360 first tie-in
365 first retainer
370 damper element cutout
375 first damper element
376 engaging segment
380 second retainer
385 second damper element
390 output disk
395 second tie-in
400 damper element
405 first lateral plate
410 second lateral plate 415 retainer
420 riveted connection

The invention claimed is:

1. A damper system, comprising:
an axis of rotation; and,
a damping device including a first absorber device including a flange part, a first pendulum mass and a first coupling device coupling the first pendulum mass and the flange part, and a second absorber device radially offset from the first absorber device, coupled to the flange part and including a second pendulum mass or a spring element, wherein the second absorber device includes a flange part coupled to the flange part for the first absorber device, the second absorber device includes the second pendulum mass and a second coupling device coupling the second pendulum mass to the flange part for the first absorber device and to the flange part for the second absorber device, the second pendulum mass is moveable with respect to the flange part for the first absorber device and with respect to the flange part for the second absorber device, and the first pendulum mass is moveable with respect to the flange part for the first absorber device.

2. The damper system of claim 1, wherein the second absorber device includes a flange part coupled to the flange part for the first absorber device, and at least a portion the first pendulum mass is positioned axially between the flange part for the first absorber device and the flange part for the second absorber device.

3. The damper system of claim 1, wherein:
the second pendulum mass is positioned axially between the flange part for the first absorber device and the flange part for the second absorber device.

4. The damper system of claim 1, wherein the second absorber device includes the second pendulum mass and a flange part coupled to the flange part for the first absorber device, and the second pendulum mass is positioned axially between the flange part for the first absorber device and the flange part for the second absorber device and is coupled with the flange part for the second absorber device.

5. The damper system of claim 1, wherein the first coupling device for the first absorber device reaches at least partially through the flange part for the first absorber device, the first pendulum mass for the first absorber device includes a first pendulum mass part positioned on one side of the flange part for the first absorber device and a second pendulum mass part positioned on an opposite side of the flange part for the first absorber device, and the first coupling device for the first absorber device couples the first pendulum mass part and the second pendulum mass part.

6. The damper system of claim 1, further comprising:
an output side torsionally connected to the flange part for the second absorber device.

7. The damper system of claim 1, further comprising:
an input side; and,
a first torsional damper coupling the input side with the flange part for the first absorber device.

8. The damper system of claim 7, further comprising:
an output side; and,
a second torsional damper coupling the output side with the flange part for the second absorber device.

9. The damper system of claim 1, further comprising:
an input side and an output side; and,
a torsional damper including a spring element engaged with the input side or engaged with the flange part for the first absorber device, or engaged with the flange part for the second absorber device.

10. The damper system of claim 1, further comprising:
an input side and an output side; and,
a torsional damper coupled with the input side and the second absorber device, wherein the flange part for the second absorber device is coupled with the output side.

* * * * *